US008626451B2

United States Patent
Wang et al.

(10) Patent No.: US 8,626,451 B2
(45) Date of Patent: Jan. 7, 2014

(54) METHOD AND DEVICE FOR CHARACTERIZATION AND SENSING OF EXHAUST GAS AND CONTROL OF ENGINES AND COMPONENTS FOR AFTERTREATMENT OF EXHAUST GASES

(75) Inventors: Da Yu Wang, Troy, MI (US); David M. Racine, Grand Blanc, MI (US); David D. Cabush, Howell, MI (US)

(73) Assignee: Delphi Technologies, Inc., Troy, MI (US)

( * ) Notice: Subject to any disclaimer, the term of this patent is extended or adjusted under 35 U.S.C. 154(b) by 481 days.

(21) Appl. No.: 12/974,266

(22) Filed: Dec. 21, 2010

(65) Prior Publication Data

US 2012/0158313 A1   Jun. 21, 2012

(51) Int. Cl.
  *G01N 25/36*   (2006.01)
(52) U.S. Cl.
  USPC .......... 702/24; 702/22; 702/23; 702/30; 702/104; 73/23.2; 73/23.32; 73/114.71; 73/114.72; 204/424; 204/427; 204/431; 422/83; 422/98
(58) Field of Classification Search
  USPC .......... 702/22, 23, 24, 30, 50, 100, 104; 73/1.02, 23.32, 114.71, 114.72, 23.2; 204/424, 427, 431; 422/83, 98
  See application file for complete search history.

(56) References Cited

U.S. PATENT DOCUMENTS

| | | | |
|---|---|---|---|
| 4,905,652 A * | 3/1990 | Nakajima et al. | 123/679 |
| 4,911,892 A * | 3/1990 | Grace et al. | 422/94 |
| 5,369,956 A | 12/1994 | Daudel et al. | |
| 6,295,809 B1 | 10/2001 | Hammerle et al. | |
| 6,303,012 B1 * | 10/2001 | Inoue et al. | 204/425 |
| 6,442,998 B2 * | 9/2002 | Kurokawa et al. | 73/31.05 |
| 6,446,488 B1 * | 9/2002 | Kurokawa et al. | 73/31.05 |
| 6,532,736 B2 | 3/2003 | Hammerle et al. | |
| 6,579,435 B2 | 6/2003 | Wang et al. | |
| 6,616,820 B2 | 9/2003 | Wang et al. | |
| 6,746,584 B1 | 6/2004 | Wang et al. | |
| 7,153,695 B2 * | 12/2006 | Roeraade et al. | 436/163 |
| 8,092,663 B2 * | 1/2012 | Hada et al. | 204/406 |
| 8,215,153 B2 * | 7/2012 | Matsubara et al. | 73/31.05 |
| 8,361,306 B2 * | 1/2013 | Teramoto et al. | 205/784.5 |
| 2006/0151338 A1 | 7/2006 | Wang et al. | |
| 2007/0007134 A1* | 1/2007 | Kawase et al. | 204/406 |
| 2007/0080075 A1* | 4/2007 | Wang et al. | 205/781 |
| 2007/0125647 A1 | 6/2007 | Wang et al. | |
| 2009/0050481 A1* | 2/2009 | Goto | 204/427 |
| 2011/0210013 A1* | 9/2011 | Ramaswamy et al. | 205/775 |

* cited by examiner

*Primary Examiner* — Alexander H Taningco
*Assistant Examiner* — Paul D Lee
(74) *Attorney, Agent, or Firm* — Mark H. Svoboda (57) ABSTRACT

A method and device allow the determination of the concentrations of a plurality of gas species in a gas mixture based on the output signals from a plurality of gas sensors, each of which is sensitive to a plurality of gas species in the gas mixture. The method includes measuring the response of each sensor at a number of levels of each gas in the mixture, determining a mathematical representation of the response characteristics of each sensor, and using the mathematical representation to determine gas concentrations from sensor readings.

7 Claims, 11 Drawing Sheets

METHOD AND DEVICE FOR CHARACTERIZATION AND SENSING OF EXHAUST GAS AND CONTROL OF ENGINES AND COMPONENTS FOR AFTERTREATMENT OF EXHAUST GASES

BACKGROUND OF THE INVENTION

Internal combustion engines used on vehicles produce a mixture of different gas species in their exhaust streams. It may be useful to characterize the concentration of a particular gas species in the gas mixture. For example, an oxygen sensor may be used to determine air/fuel ratio and to provide a feedback signal for controlling the engine to achieve a desired air/fuel ratio. A gas species sensor may also be useful for controlling an exhaust aftertreatment device. For example, an SCR catalyst may utilize urea provided by a urea delivery system to reduce NO and $NO_2$ in a diesel engine exhaust stream, and an ammonia ($NH_3$) sensor may be used downstream of the SCR catalyst to control the rate of urea delivery. Knowledge of a gas species concentration may also be useful in providing required On-Board Diagnostic (OBD) information.

A gas species sensor produces an output that varies with the concentration of the gas species. However, the sensor may be sensitive to a number of different gas species. As a result, the output of the sensor may be influenced not only by the gas species that it is desirable to measure, but also by other gases in the mixture.

It is therefore desirable to provide a method for determining the concentration of a given gas species in the presence of other gas species.

BRIEF SUMMARY OF THE INVENTION

A method for determining the concentration of a first gas species in a gas mixture is provided in accordance with an exemplary embodiment. The method includes measuring a first output signal from a first gas sensor whose output depends according to a first functional relationship on the amount of the first gas species in the gas mixture and on the amount of a second gas species in the gas mixture. The method further includes measuring a second output signal from a second gas sensor whose output depends according to a second functional relationship on the amount of the first gas species in the gas mixture and on the amount of the second gas species in the gas mixture, where the second functional relationship is different than the first functional relationship. The method further includes using the measured values of both the first output signal and the second output signal to determine the concentration of the first gas species in the gas mixture according to the first functional relationship and the second functional relationship.

A system for determining the concentration of a first gas species in a gas mixture is provided in accordance with an exemplary embodiment. The system includes means for receiving a first output signal from a first gas sensor whose output depends according to a first functional relationship on the amount of the first gas species in the gas mixture and on the amount of a second gas species in the gas mixture. The system further includes means for receiving a second output signal from a second gas sensor whose output depends according to a second functional relationship on the amount of the first gas species in the gas mixture and on the amount of the second gas species in the gas mixture, where the second functional relationship is different than the first functional relationship. The system means for determining the concentration of the first gas species in the gas mixture using the first output signal and the second output signal according to the first functional relationship and the second functional relationship.

A method for determining a functional relationship between the output of a gas sensor and the concentrations of a plurality of gas species that influence the output of the gas sensor is provided. The method allows characterization of a gas sensor while requiring fewer measurements than required by a conventional method.

DETAILED DESCRIPTION OF THE INVENTION

Figure 1:
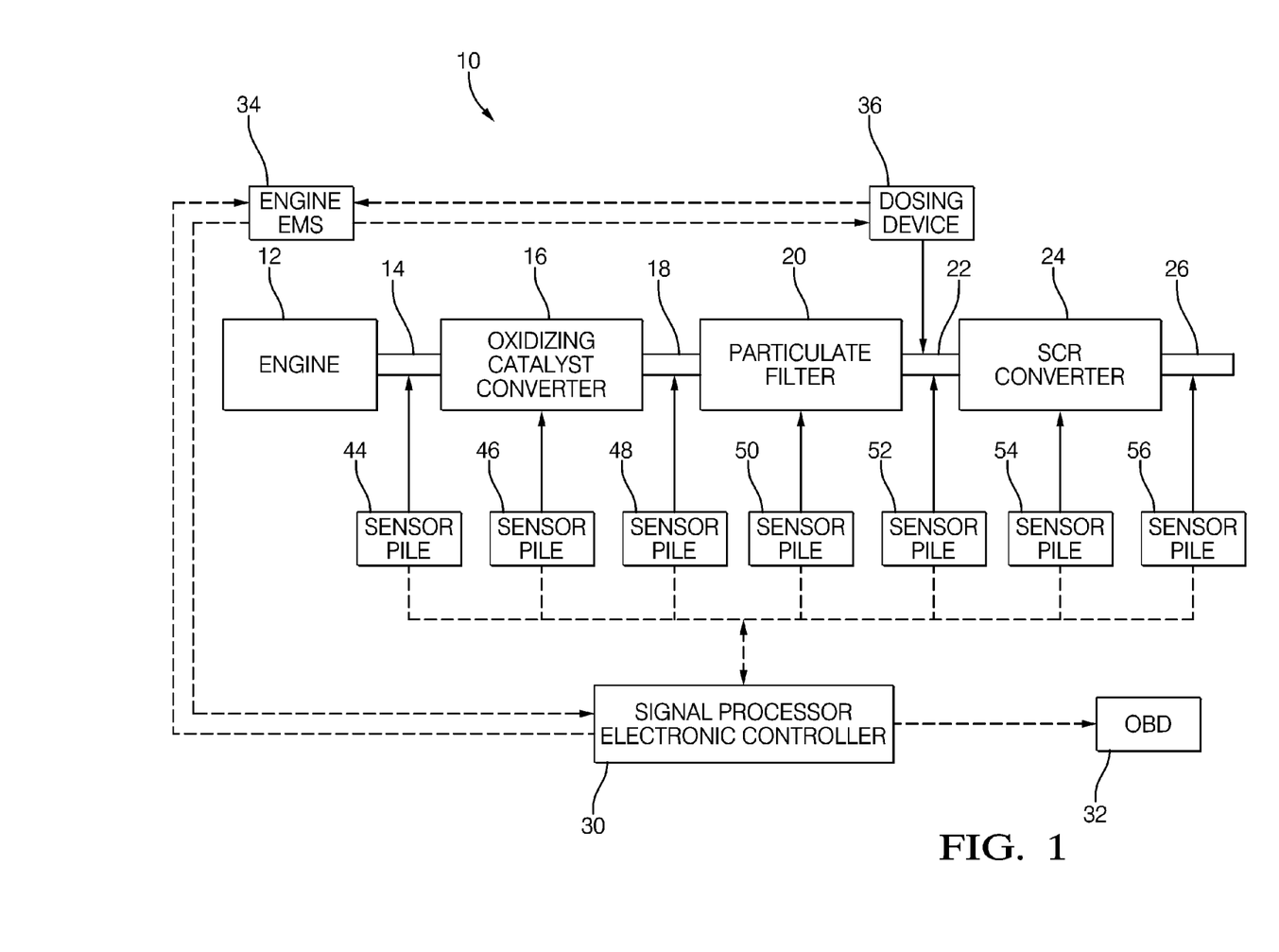
FIG. 1 is a block diagram of a motor vehicle showing a plurality of gas sensors.

FIG. 1 depicts a vehicle system 10 that incorporates various aspects of the present invention. The vehicle system 10 is shown containing components that may be present for a vehicle having a diesel engine. It is to be understood that vehicle system 10 may not include every component depicted in FIG. 1. For example, a vehicle system that includes a diesel engine may not include every component shown in FIG. 1. Alternatively, a vehicle system may use an engine fueled by a gasoline, ethanol, or another fuel other than diesel fuel, and likewise may not include every component shown in FIG. 1.

The vehicle system 10 includes an engine 12 that combusts a fuel, thereby producing combustion byproducts. The vehicle system 10 includes a number of components whose effect is to modify the chemical composition of the combustion byproducts before exhausting them to the atmosphere through the vehicle tail pipe.

The combustion byproducts are expelled from the engine 12 through a first exhaust pipe 14. In the following discussion, it is to be understood that the term "sensor pile" means one or more sensors, which may include gas composition sensors, humidity sensors, temperature sensors, or any other sensors that may be useful in characterizing the operation of a gas mixture. One or more sensors indicated as sensor pile 44 in fluid communication with first exhaust pipe 14 may be used to characterize the exhaust gas in first exhaust pipe 14. The exhaust gas flows from first exhaust pipe 14 into oxidizing catalytic converter 16. One or more sensors indicated as sensor pile 46 in fluid communication with oxidizing catalytic converter 16 may be used to characterize the exhaust gas in oxidizing catalytic converter 16. The exhaust gas flows from oxidizing catalytic converter 16 through second exhaust pipe 18 into particulate filter 20. One or more sensors indicated as sensor pile 48 in fluid communication with second exhaust pipe 18 may be used to characterize the exhaust gas in second exhaust pipe 18. The exhaust gas then flows into particulate filter 20. One or more sensors indicated as sensor pile 50 in fluid communication with particulate filter 20 may be used to characterize the exhaust gas in particulate filter 20. From particulate filter 20 the exhaust gas flows through third exhaust pipe 22 into selective catalytic reduction (SCR) converter 24. An exhaust aftertreatment material such as urea may be introduced from a dosing device 36 into the exhaust stream at third exhaust pipe 22. One or more sensors indicated as sensor pile 52 in fluid communication with third exhaust pipe 22 may be used to characterize the exhaust gas in third exhaust pipe 22, and one or more sensors indicated as sensor pile 54 in fluid communication with SCR converter 24 may be used to characterize the exhaust gas in SCR converter 24. Finally, the exhaust gas passes through vehicle tail pipe 26 into the atmosphere. One or more sensors indicated as sensor pile 56 in fluid communication with tail pipe 26 may be used to characterize the exhaust gas in tail pipe 26.

The outputs of sensor piles 44, 46, 48, 50, 52, 54, and 56 are provided to signal processor electronic controller 30. Signal processor electronic controller 30 processes the signals received from the sensor piles 44, 46, 48, 50, 52, 54, and 56 to determine the concentrations of various gas species measured at various locations in the exhaust system as the exhaust stream undergoes treatments that alter the chemical composition of the gases in the exhaust stream. While signal processor electronic controller is depicted as a separate block 30 in FIG. 1, it is to be understood that the function performed by signal processor electronic controller could be incorporated into an EMS (Engine Management System) controller 34 in an embodiment of the invention.

The EMS controller 34 receives from the signal processor electronic controller 30 information that includes the concentration of various gas species at various locations in the exhaust system. The EMS controller 34 may use this information to control aspects of engine operation. For example, EMS controller 34 may control fuel delivery and/or exhaust gas recirculation to the engine 12 based on information received from one or more of the sensors in sensor piles 44, 46, 48, 50, 52, 56, and 56. Additionally, EMS controller may control urea delivery from dosing device 36 in order to control nitrous oxides and ammonia emissions based on information received from one or more of the sensors in sensor piles 52, 54, and 56.

Information about the concentrations of various gas species at various locations in the exhaust system may also be useful for diagnosing whether components of the vehicle system 10 are functioning properly. For this reason, information that includes the concentrations of various gas species at various locations in the exhaust system may be provided to a diagnostic function, identified in FIG. 1 as OBD block 32.

The sensor piles 44, 46, 48, 50, 52, 54, and 56 may each comprise one or more sensing devices that are based on electrochemical emf measurement methods. Such a sensing device has a sensing electrode and a reference electrode, both of which are in contact with a solid electrolyte to form an electrochemical cell. Both electrodes may be exposed to the same exhaust gas stream, or the sensing electrode may be exposed to the exhaust gas stream while the reference electrode may be exposed to a reference gas different than the exhaust gas, for example air. The electrochemical cell may also have a heater and a temperature sensor to maintain the cell at a desired operating temperature. The cell may also have a protective coating layer over an electrode to prevent the electrode from being "poisoned" by substances in the exhaust gas. A coating may have a specific catalytic function so as to modify the composition of the exhaust gas as it diffuses through the coating layer before being sensed by the sensing electrode.

The output of an electrochemical cell is an emf (voltage) that may include contributions from a number of individual electrochemical reactions taking place in the cell due to a number of individual reagents in the exhaust gas stream. The exhaust stream may include a number of oxidation agents (such as $NO$, $NO_2$, $N_2O$, $O_2$) or reducing agents (such as $CH_x$, $CO$, $NH_3$). Each oxidation agent or reducing agent may contribute an emf, where the total emf produced by the sensor is the sum of the individual emf contributions of the individual agents in the gas.

Figure 2A:
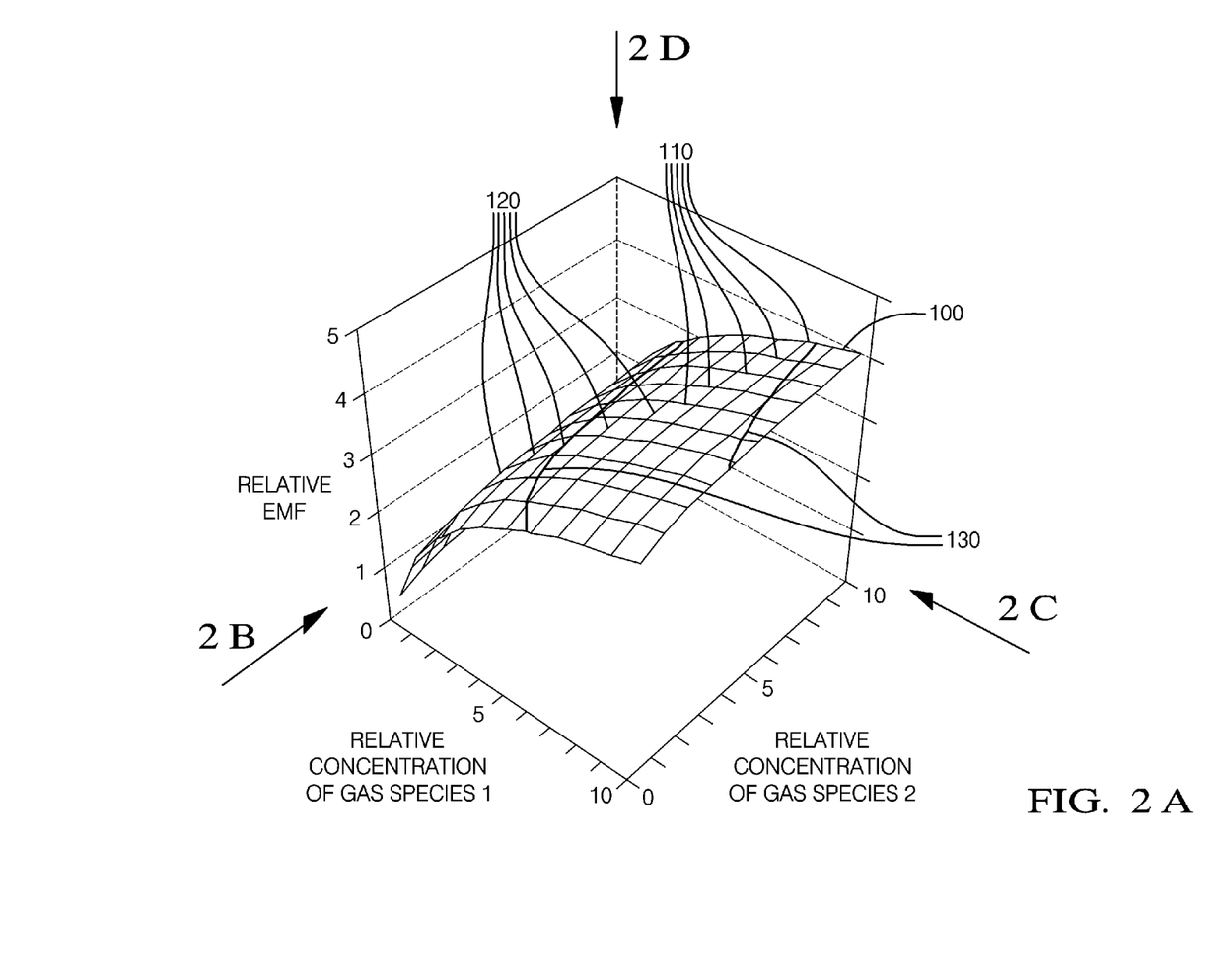
FIG. 2A is a 3-dimensional representation of the output of a first gas sensor.
Figure 2B:
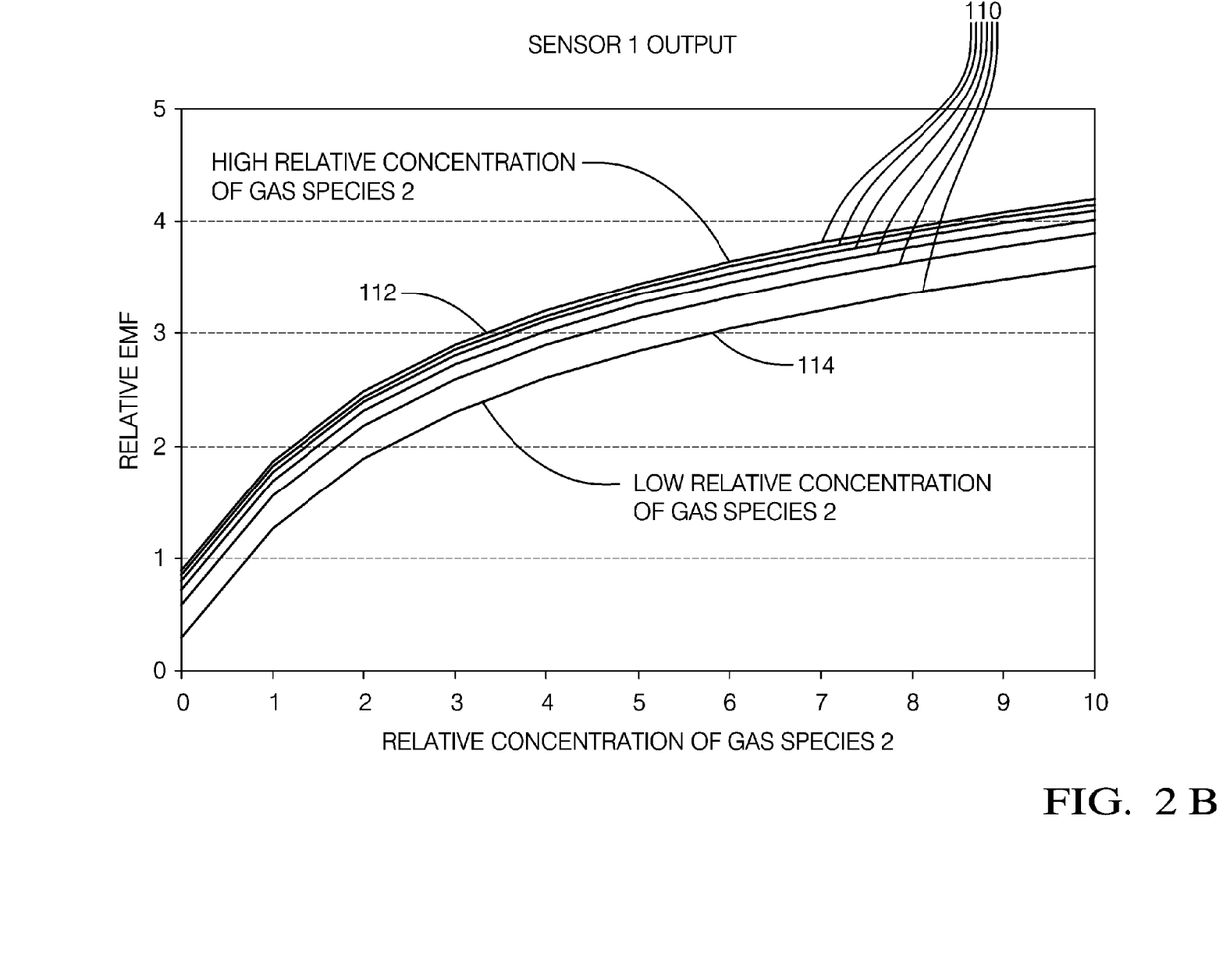
FIG. 2B is a representation of the output of the gas sensor of FIG. 2A viewed along direction "B" of FIG. 2A.
Figure 2C:
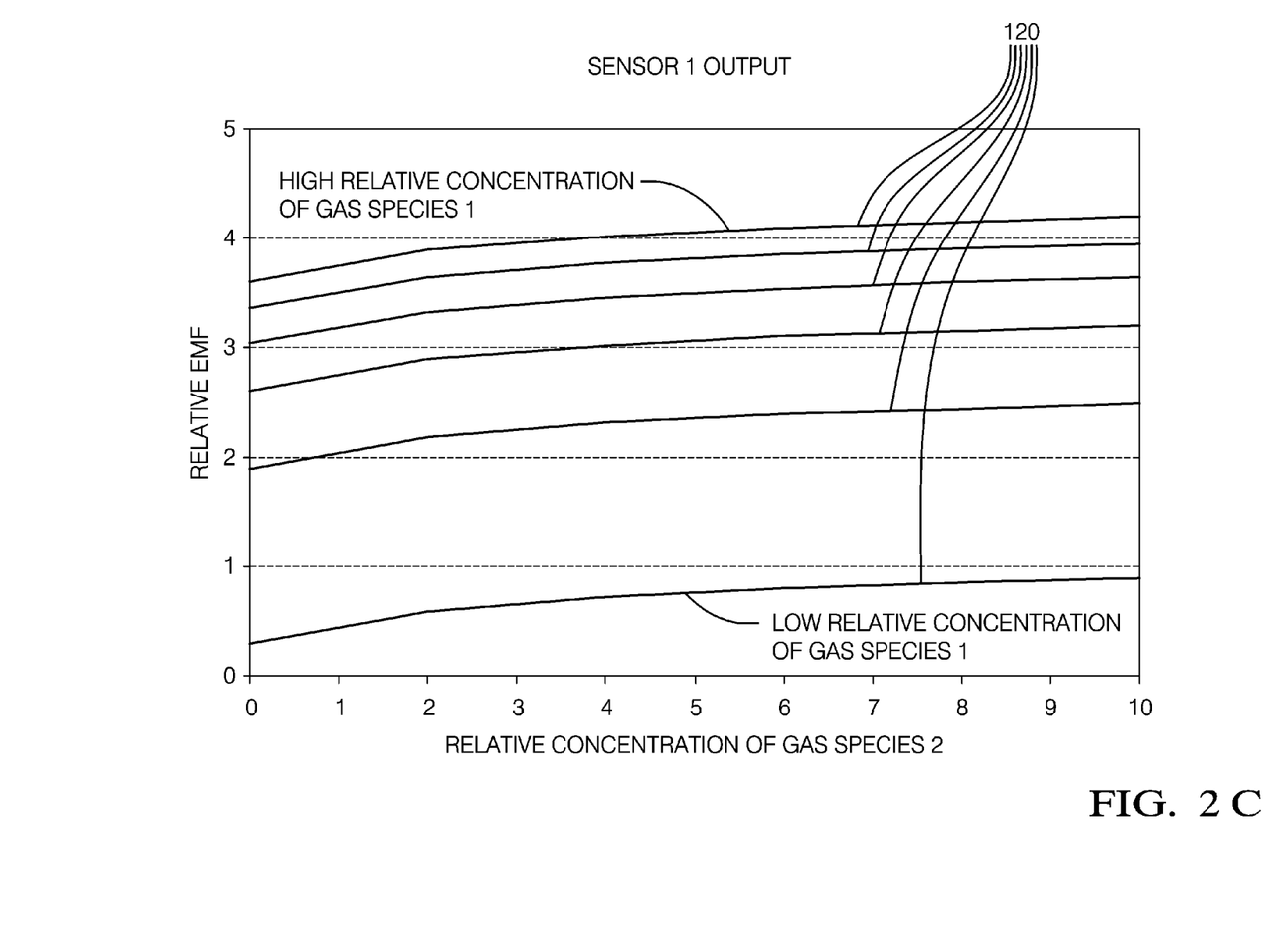
FIG. 2C is a representation of the output of the gas sensor of FIG. 2A viewed along direction "C" of FIG. 2A.
Figure 2D:
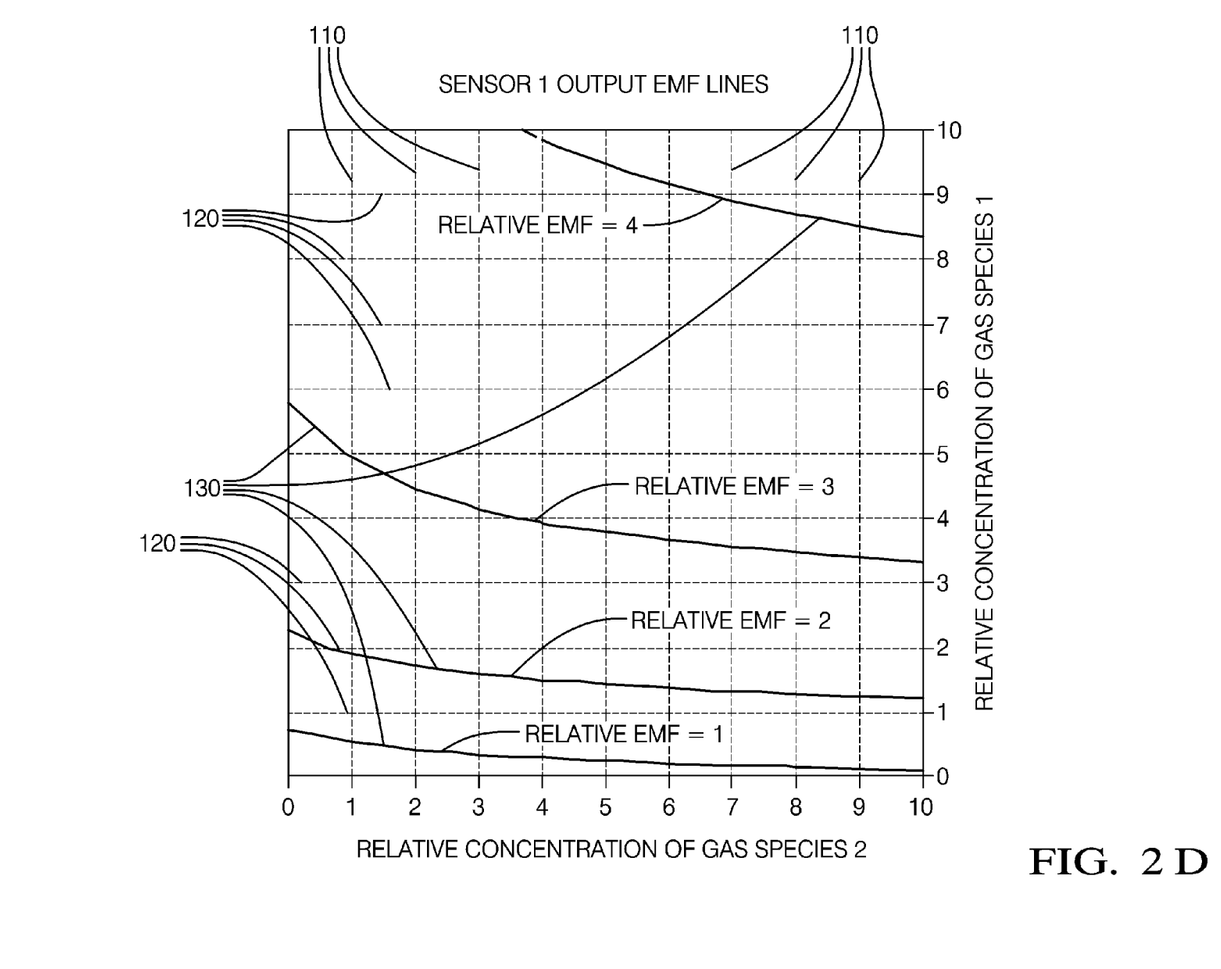
FIG. 2D is a representation of the output of the gas sensor of FIG. 2A viewed along direction "D" of FIG. 2A.
Figure 3:
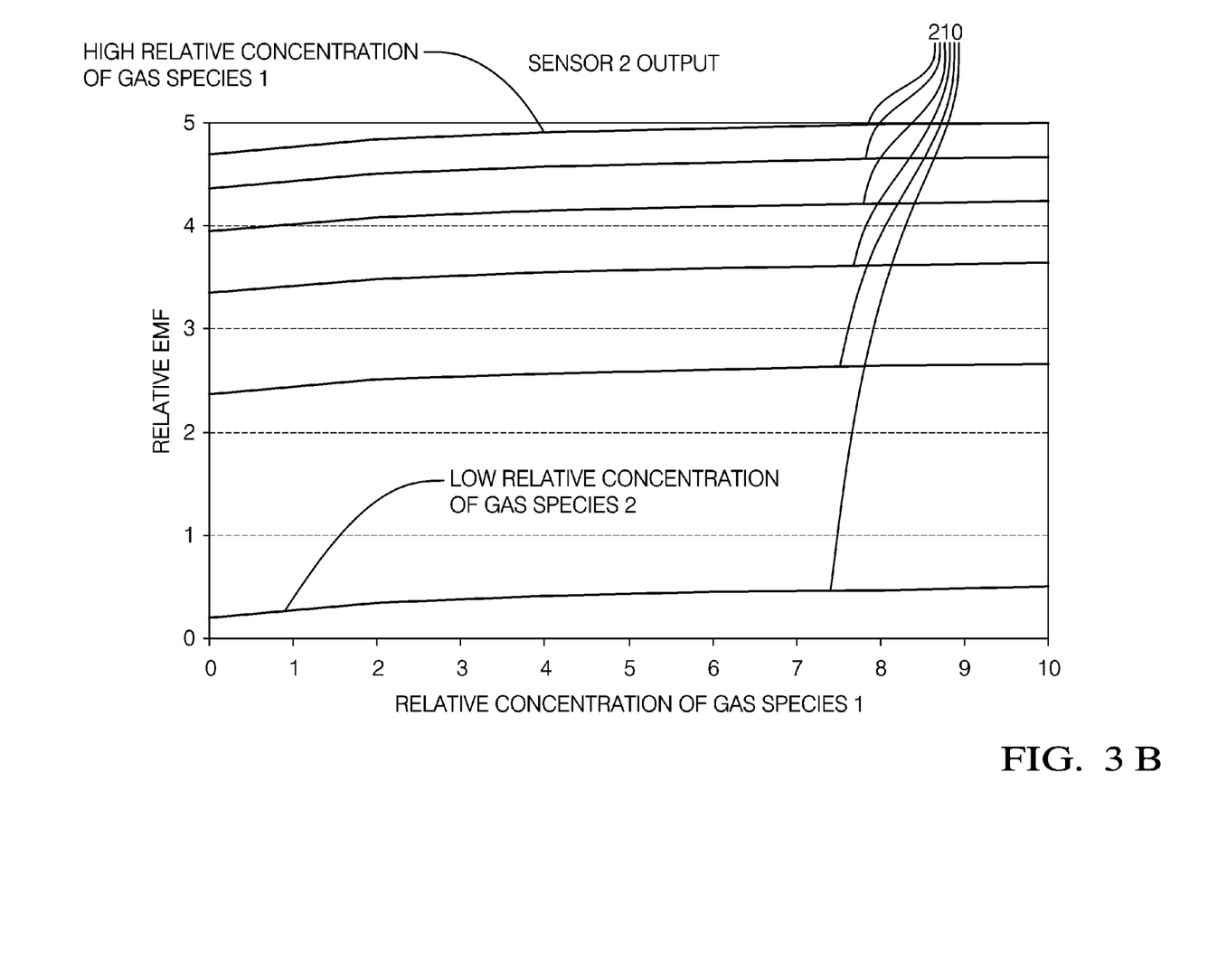
FIG. 3A is a 3-dimensional representation of the output of a second gas sensor.
FIG. 3B is a representation of the output of the gas sensor of FIG. 3A viewed along direction "B" of FIG. 3A.
FIG. 3C is a representation of the output of the gas sensor of FIG. 3A viewed along direction "C" of FIG. 3A.
FIG. 3D is a representation of the output of the gas sensor of FIG. 3A viewed along direction "D" of FIG. 3A.
Figure 3A:
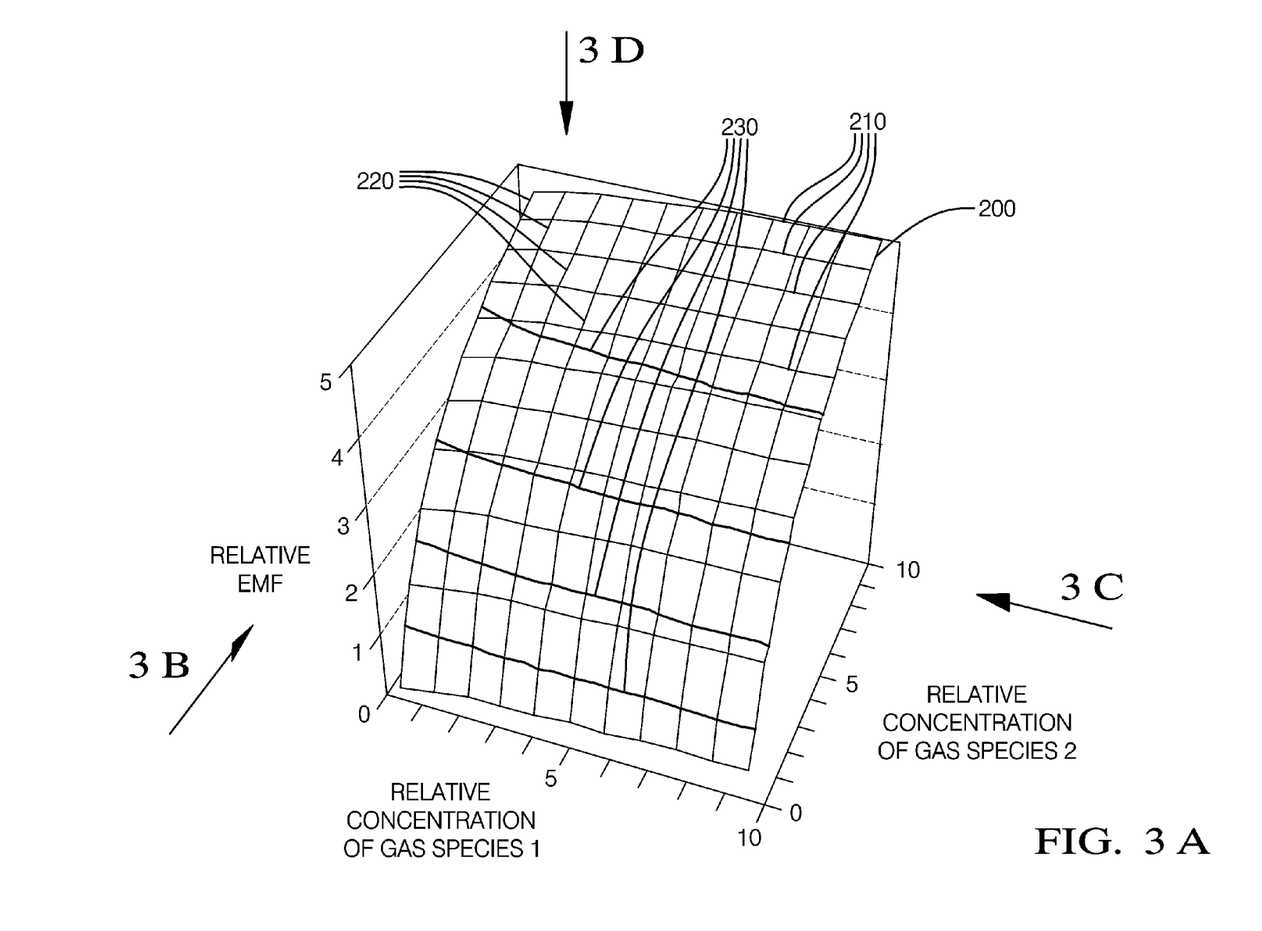
Figure 3C:
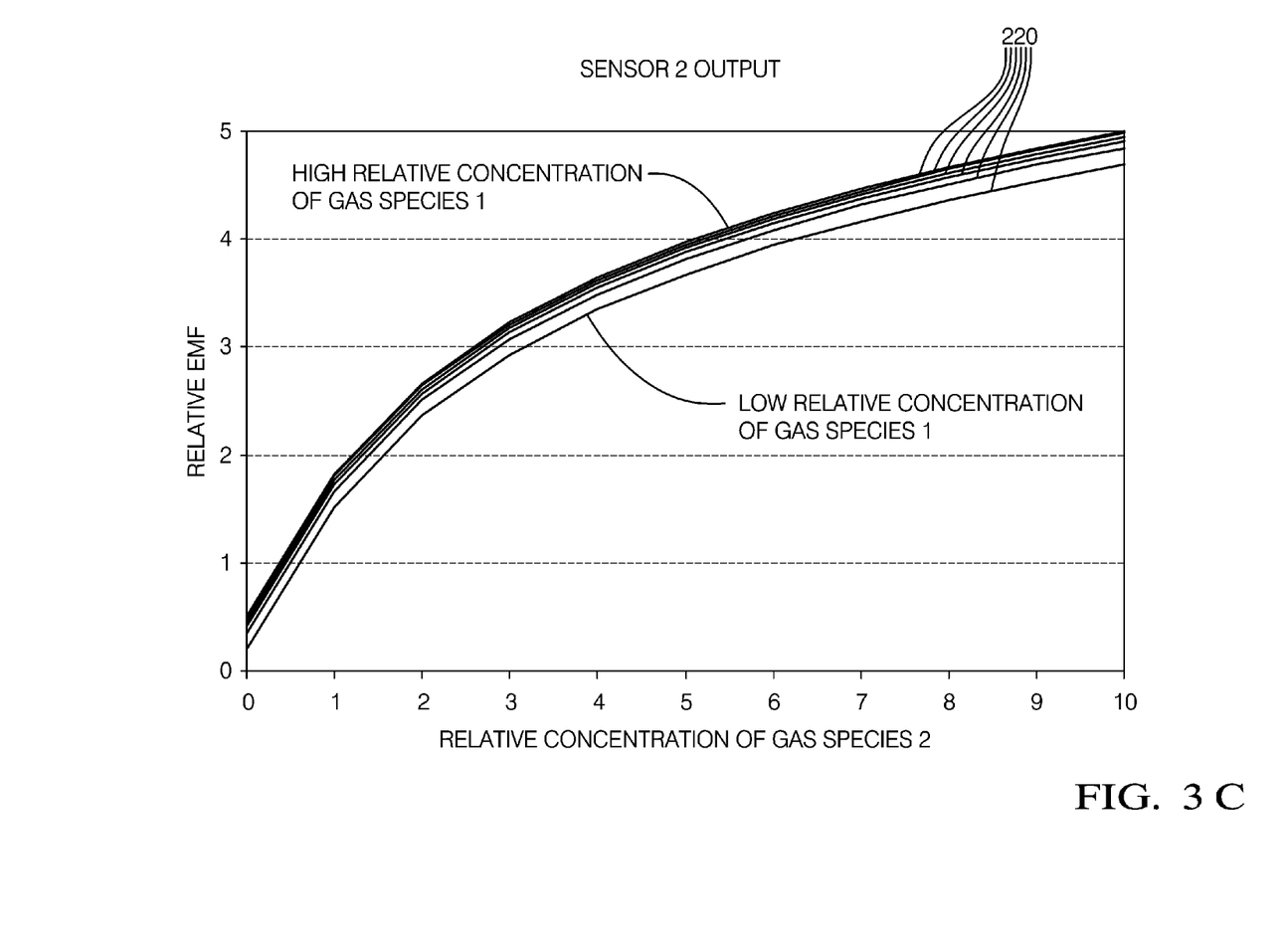
Figure 3D:
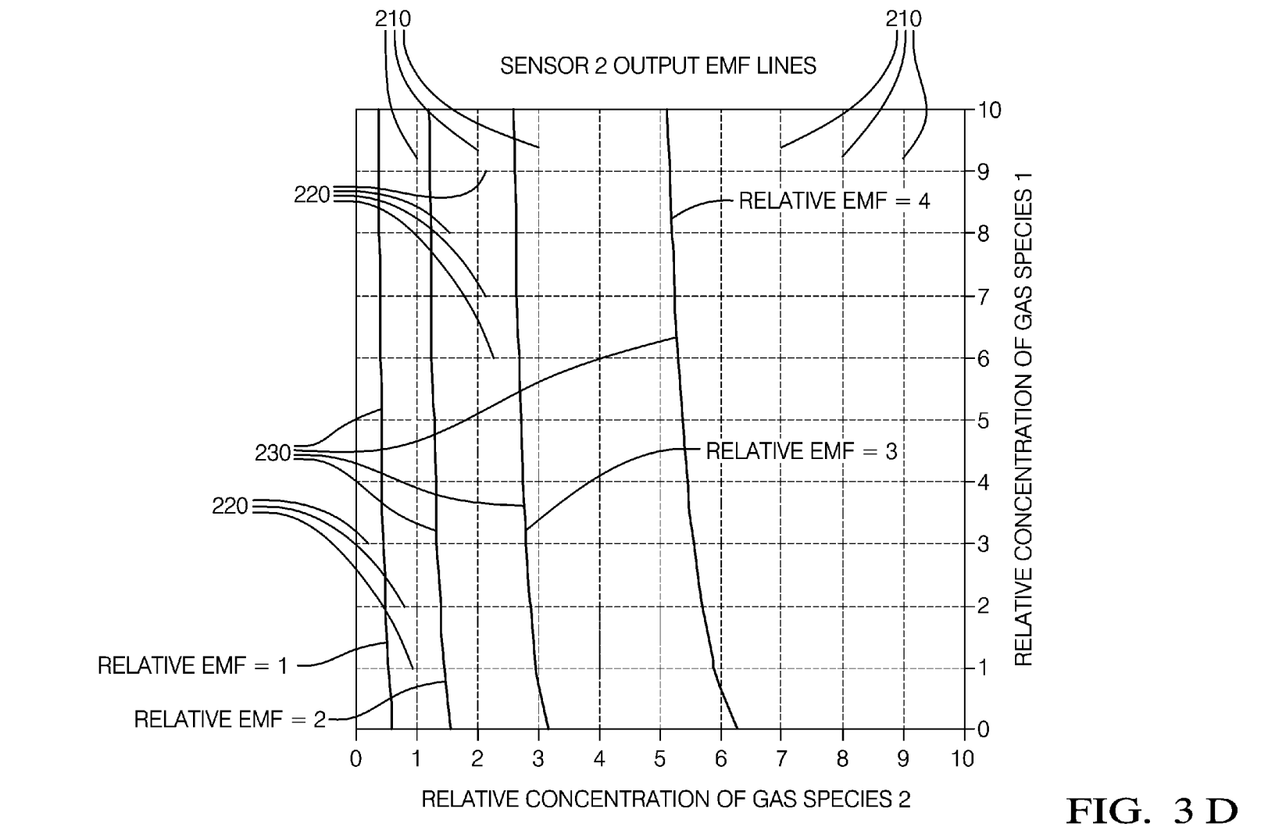
Figure 4:
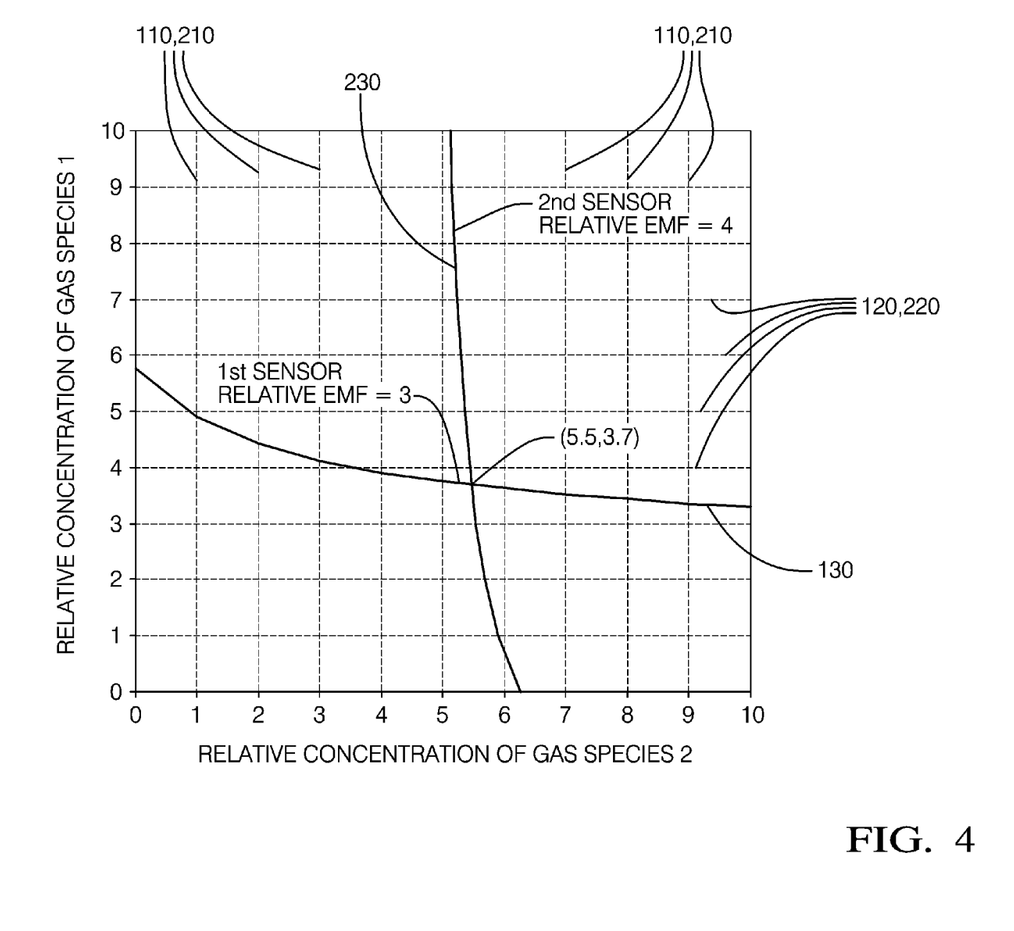
FIG. 4 is a graphical representation of using the outputs of the sensors of FIGS. 2A-2D and FIGS. 3A-3D to determine a concentration of a gas species.

To illustrate aspects of the methods and systems of this invention, FIGS. 2-4 illustrate a hypothetical situation involving two gas sensors, each of which is influenced by the concentration of two individual gas species. It should be noted that the discussion of FIGS. 2-4 is based on modeled sensor characteristics and not on the output characteristics of actual sensors. The units used to describe gas species concentrations and emf values in FIGS. 2-4 are relative units rather than specific engineering units.

FIG. 2A illustrates a modeled response of a first gas sensor in response to the concentration of two gas species (species 1 and species 2). As shown, the emf output of the first gas sensor increases with increasing concentrations of both species 1 and species 2. The response of the first gas sensor can be represented as surface 100, where the height of surface 100 represents the relative emf output of the first gas sensor produced by the combined effects of gas species 1 and gas species 2. As seen in FIG. 2A, the surface 100 can be considered to be defined by a plurality of lines 110 where each line 110 represents the relative emf output of the first gas sensor over a range of relative concentration of gas species 1 for a given relative concentration of gas species 2. Alternatively stated, each line 110 represents the intersection of the surface 100 with a plane that represents a constant relative concentration of gas species 2.

The surface 100 can additionally be considered to be defined by a plurality of lines 120 where each line 120 represents the relative emf output of the first gas sensor over a range of relative concentration of gas species 2 for a given relative concentration of gas species 1. Alternatively stated, each line 120 represents the intersection of the surface 100 with a plane that represents a constant relative concentration of gas species 1.

FIG. 2A also shows a series of contour lines 130, where points along each contour line represent a given relative emf output from the first gas sensor. Alternatively, each line 130 represents the intersection of the surface 100 with a plane that represents a constant relative emf output. The significance of lines 110, 120, and 130 will be seen more clearly with reference to FIGS. 2B, 2C, and 2D, which represent views of the response surface 100 in the directions of arrows "B", "C", and "D" respectively of FIG. 2A.

FIG. 2B represents a view of the surface 100 of FIG. 2A in the direction of arrow "B" of FIG. 2A. The relationship between the relative emf output of the first gas sensor and the relative concentration of gas species 1 is seen as a family of curves 110, where each curve 110 represents the relationship at a given concentration of gas species 2. It will be appreciated that each line 110 in FIG. 2B corresponds to a line 110 seen in the three-dimensional representation of response surface 100 depicted in FIG. 2A. Because the output of the first gas sensor depends not only on the relative concentration of gas species 1 but also on the relative concentration of gas species 2, the relative concentration of gas species 1 cannot be determined exactly from the relative emf output of the first gas sensor. Point 112 in FIG. 2B represents a point at which the relative emf output of the first gas sensor is 3 emf units at a high relative concentration of gas species 2, and point 114 in FIG. 2B represents a point at which the relative emf output of the first gas sensor is 3 emf units at a low relative concentration of gas species 2. As shown in FIG. 2B, point 112 is at a relative concentration of gas species 1 somewhere between 3 and 4 relative concentration units, and point 114 is at a relative concentration of gas species 1 somewhere between 5 and 6 relative concentration units. The cross sensitivity of the first gas sensor to gas species 2 in addition to gas species 1 prevents the relative concentration of gas species 1 from being discerned based solely on the emf output of the first gas sensor.

FIG. 2C represents a view of the surface 100 of FIG. 2A in the direction of arrow "C" of FIG. 2A. The relationship between the relative emf output of the first gas sensor and the relative concentration of gas species 2 is seen as a family of curves 120, where each curve 120 represents the relationship at a given concentration of gas species 1. It will be appreciated that each line 120 in FIG. 2C corresponds to a line 120 seen in the three-dimensional representation of response surface 100 depicted in FIG. 2A. Comparing FIG. 2B with FIG. 2C, it is apparent that the modeled characteristics used to represent the first sensor in this example describe a sensor whose output depends primarily on the relative concentration of gas species 1 and to a lesser extent on the output of gas species 2.

FIG. 2D is a top view of the surface 100 of FIG. 2A, that is, a view in direction "D" indicated on FIG. 2A. In this view, the lines 110 representing constant relative concentrations of species 2 appear as vertical lines in FIG. 2D, and the lines 120 representing constant relative concentrations of species 1 appear as horizontal lines in FIG. 2D. It is to be understood that each line 110 and 120 is not labeled in FIG. 2D for clarity, but that each vertical and horizontal line defining the grid in FIG. 2D represents a line 110 and a line 120 respectively. The lines 130 which represent constant values of relative emf output from the first sensor appear as shown, analogous to constant altitude lines on a topographical map.

FIG. 3A illustrates a modeled response of a second gas sensor in response to the concentration of two gas species (species 1 and species 2). As shown, the emf output of the second gas sensor increases with increasing concentrations of both species 1 and species 2. The response of the second gas sensor can be represented as surface 200, where the height of surface 200 represents the relative emf output of the second gas sensor produced by the combined effects of gas species 1 and gas species 2. As seen in FIG. 3A, the surface 200 can be considered to be defined by a plurality of lines 210 where each line 210 represents the relative emf output of the second gas sensor over a range of relative concentration of gas species 1 for a given relative concentration of gas species 2. Alternatively stated, each line 210 represents the intersection of the surface 200 with a plane that represents a constant relative concentration of gas species 2.

The surface 200 can additionally be considered to be defined by a plurality of lines 220 where each line 220 represents the relative emf output of the second gas sensor over a range of relative concentration of gas species 2 for a given relative concentration of gas species 1. Alternatively stated, each line 220 represents the intersection of the surface 200 with a plane that represents a constant relative concentration of gas species 1.

FIG. 3A also shows a series of contour lines 230, where points along each contour line represent a given relative emf output from the second gas sensor. Alternatively, each line 230 represents the intersection of the surface 200 with a plane that represents a constant relative emf output. The significance of lines 210, 220, and 230 will be seen more clearly with reference to FIGS. 3B, 3C, and 3D, which represent views of the response surface 200 in the directions of arrows "B", "C", and "D" respectively of FIG. 3A.

FIG. 3B represents a view of the surface 200 of FIG. 3A in the direction of arrow "B" of FIG. 3A. The relationship between the relative emf output of the second gas sensor and the relative concentration of gas species 1 is seen as a family of curves 210, where each curve 210 represents the relationship at a given concentration of gas species 2. It will be appreciated that each line 210 in FIG. 3B corresponds to a line 210 seen in the three-dimensional representation of response surface 200 depicted in FIG. 3A. Because the output of the second gas sensor depends not only on the relative concentration of gas species 1 but also on the relative concentration of gas species 2, the relative concentration of gas species 1 cannot be determined exactly from the relative emf output of the second gas sensor. The cross sensitivity of the second gas sensor to gas species 2 in addition to gas species 1 prevents the relative concentration of gas species 1 from being discerned based solely on the emf output of the second gas sensor.

FIG. 3C represents a view of the surface 200 of FIG. 3A in the direction of arrow "C" of FIG. 3A. The relationship between the relative emf output of the second gas sensor and the relative concentration of gas species 2 is seen as a family of curves 220, where each curve 220 represents the relationship at a given concentration of gas species 1. It will be appreciated that each lines 220 in FIG. 3C corresponds to a lines 220 seen in the three-dimensional representation of response surface 200 depicted in FIG. 3A. Comparing FIG. 3B with FIG. 3C, it is apparent that the modeled characteristics used to represent the second sensor in this example describe a sensor whose output depends primarily on the relative concentration of gas species 2 and to a lesser extent on the output of gas species 1.

FIG. 3D is a top view of the surface 200 of FIG. 3A, that is, a view in direction "D" indicated on FIG. 3A. In this view, the lines 210 representing constant relative concentrations of species 2 appear as vertical lines in FIG. 3D, and the lines 220 representing constant relative concentrations of species 1 appear as horizontal lines in FIG. 3D. It is to be understood that each line 210 and 220 is not labeled in FIG. 3D for clarity, but that each vertical and horizontal line defining the grid in FIG. 3D represents a line 210 and a line 220 respectively. The lines 230 which represent constant values of relative emf output from the second sensor appear as shown, analogous to constant altitude lines on a topographical map.

If the response of a plurality of gas sensors having non-identical response characteristics to a plurality of gas species is known, the information from the plurality of sensors can be combined to extract information regarding the relative concentrations of each of the gas species. Consider the sensors having characteristics as modeled in FIGS. 2 and 3, exposed to a gas mixture comprising levels of gas species 1 and gas species 2 such that the first sensor has an output of 3 relative emf units and the second sensor has an output of 4 relative emf units. It will be appreciated that the levels of gas species 1 and gas species 2 that would produce this combination of output emf can be determined as the intersection of the line 130 representing a first sensor emf value of 3 emf units from FIG. 2D and the line 230 representing a second sensor emf value of 4 emf units from FIG. 3D. FIG. 4 is a representation of these two particular lines 130, 230 plotted on the same chart. From FIG. 4 it can readily be determined that, for the sensors whose characteristics are as modeled in FIGS. 2 and 3, the first sensor will have an emf output of 3 emf units and the second sensor will have an emf output of 4 emf units when the concentration of gas species 1 is 3.7 concentration units and the concentration of gas species 2 is 5.5 concentration units.

While the process for determining the relative concentrations of the gas species in a gas mixture may appear straightforward, it is only possible if the response characteristics of the gas sensors are well understood. For the example presented in FIGS. 2-4, the response characteristics 100, 200 of the first and second gas sensors to gas species 1 and 2 were assumed to be known over the entire concentration range of the gas species. Additionally, it was assumed that the entire variation in the emf output of the first and second gas sensors was caused by concentration changes in one or both of gas species 1 and 2. Actual gas sensors may have outputs that depend on more than two gas species. In particular, sensors are known that have an output that depends on the concentration of oxygen ($O_2$) and on the concentration of water vapor ($H_2O$) in the gas mixture in addition to being sensitive to one or more other gases. In order to use the outputs of multiple gas sensors to determine the concentration of a particular gas species in a gas mixture, where the sensors have sensitivity to other gas species in addition to the species of interest, it is necessary to characterize the output of the sensor with respect to all species to which the sensors are sensitive, over the entire concentration range of all species that may be present in the gas mixture. Conventionally, this information may be stored in a lookup table in the signal processor electronic controller 30 of FIG. 1. The controller 30 would conventionally use signals from a plurality of sensors in sensor pile 44, 46, 48, 50, 52, 54, and/or 56 as inputs to the lookup table. The output of the lookup table would represent a concentration value of a gas species of interest for vehicle control and/or diagnostic purposes.

It will be appreciated that a conventional approach as described above requires a great deal of testing of a given gas sensor over a wide range of concentrations of all gas species that influence the output of that sensor in order to populate a lookup table representative of the characteristics of that sensor.

The inventors of the current invention have discovered that the output of a non-equilibrium emf sensing cell, as may be used for sensing concentrations of one or more gas species in a gas mixture, can be described by a general equation. More specifically, the inventors have discovered that the output emf of such a sensor can be expressed as an emf that is the sum of the emf contributions of individual gas species in the gas mixture. Further, the inventors have discovered that the emf contribution of each individual gas species can be described as a mathematical function that depends on the concentration of the individual gas species as well as the concentrations of oxygen and water vapor in the gas mixture.

In the discussion of the mathematical function that follows, the following convention will be used in describing terms and coefficients. A superscript will be used to denote which of a plurality of sensors is being discussed. For example, $EMF^j$ indicates the emf output of the $j^{th}$ gas sensor. A subscript will be used to denote which of a plurality of gas species is being discussed. For example, $(Species_i)$ indicates the concentration of the $i^{th}$ gas species in the gas mixture. In some instances, both a superscript and a subscript will be used. For example, $A_i^j$ indicates the value of the A term of the function describing the characteristics of the $j^{th}$ gas sensor with respect to the $i^{th}$ gas species.

It has been discovered that the total emf output of a given sensor (the $j^{th}$ sensor) can be described by a function of the form $$EMF^j = \sum_{i=1}^{total\#ofspecies} \left\{ \sinh^{-1}\left[(Species_i) \div \left(A_i^j \cdot \sqrt[C_i^j]{(O_2)} \cdot \sqrt[D_i^j]{(H_2O)}\right)\right] \div B_i^j \right\} \quad \text{(Equation 1)}$$

In Equation 1 above, $\sinh^{-1}$ indicates the inverse hyperbolic sine function, $(Species_i)$ indicates the concentration of the $i^{th}$ gas species, $(O_2)$ and $(H_2O)$ represent the concentrations of oxygen and water vapor in the gas mixture to which the sensor is exposed, $A_i^j$, $B_i^j$, $C_i^j$, and $D_i^j$ are terms characteristic of the response of the $j^{th}$ gas sensor with respect to the $i^{th}$ gas species.

As previously stated, the response of each sensor over the entire concentration ranges of interest of all gas species to which the sensor is responsive must be determined in order to use the sensors to determine the concentration of a given gas species of interest. With knowledge of the mathematical function that describes the response of a sensor, it is possible to determine the response characteristics of a given sensor with less effort than would be required to map the sensor over all ranges of all gas species.

Figure 5:
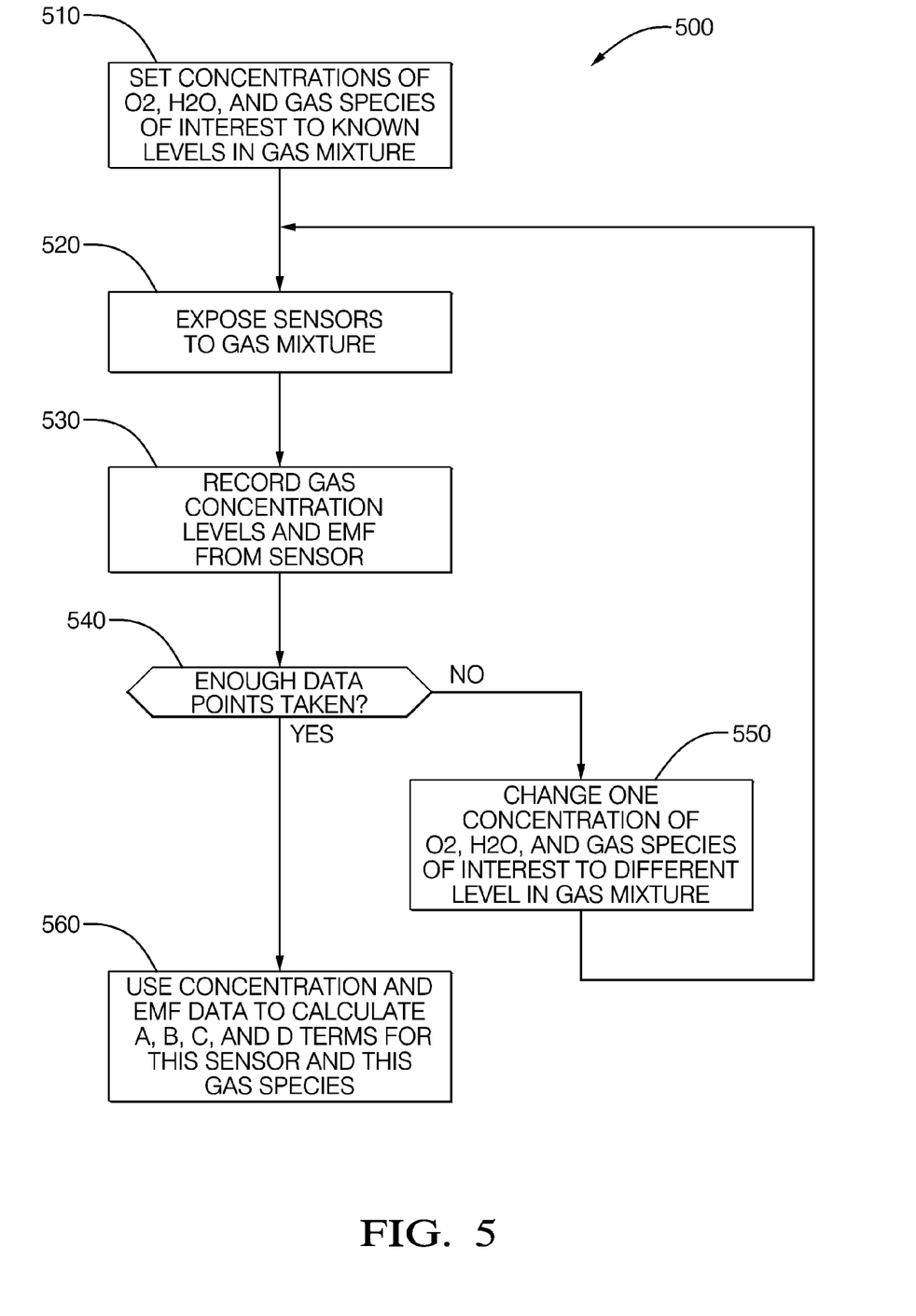
FIG. 5 is a flow chart of a method for determining a concentration of a gas species in accordance with an exemplary embodiment.

A method for determining the terms characteristic of the response of a given gas sensor to a given gas species is depicted in the flow chart of FIG. 5. The method 500 includes the step 510 of setting the concentrations of oxygen, water vapor, and a gas species of interest to known levels in a gas mixture. In step 520, a gas sensor is exposed to the gas mixture established in step 510. The concentrations of the constituent gases in the gas mixture and the emf level produced by the sensor are recorded in step 530. Step 540 determines whether enough data points have been taken to allow adequate characterization of the sensor. The number of data points that is sufficient may depend on the response of the gas sensor to the gas species of interest, the influence of oxygen and water vapor on the response of the gas sensor to the gas species of interest, the environment in which the gas sensor is to be used, and the required resolution or accuracy of the gas species determination to perform the desired control or diagnostic function in vehicle system 10.

If it is determined in step 540 that not enough data points have been taken, the concentration of oxygen, water vapor, or the gas species of interest is changed to a different level in the gas mixture in step 550. The method then returns to step 520 using the modified gas mixture. The gas sensor is exposed to the modified gas mixture in step 520, and the present levels of gas concentration and sensor emf are recorded in step 530. These steps are repeated until it is determined at step 540 that data has been taken at a sufficient number of combinations of gas concentrations. From Equation 1 above, it will be appreciated that the equation for $\text{emf}_i^j$ (representing the output of the $j^{th}$ sensor in response to the concentration of the $i^{th}$ gas species) is given by:

$$\text{emf}_i^j = \sinh^{-1}\left[(\text{Species}_i) \div \left(A_i^j \cdot \sqrt[C_i^j]{(O_2)} \cdot \sqrt[D_i^j]{(H_2O)}\right)\right] \div B_i^j \quad \text{(Equation 2)}$$

Each data point recorded in step 530 represents a combination of $\text{emf}_i^j$, $(\text{Species}_i)$, $(O_2)$, and $(H_2O)$. In step 560, the values of $\text{emf}_i^j$, $(\text{Species}_i)$, $(O_2)$, and $(H_2O)$ measured in step 530 are substituted into Equation 2 and known fitting methods are used to obtain values for $A_i^j$, $B_i^j$, $C_i^j$, and $D_i^j$ for the $j^{th}$ sensor in response to the concentration of the $i^{th}$ gas species. The method 500 can be repeated as often as required to characterize as many sensors as necessary in response to all gas species of interest.

For example, if a first sensor (j=1) is sensitive to $NH_3$ and $NO_2$, it can be characterized by exposing the sensor to a gas mixture that contains no $NO_2$, measuring the response (emf output) of the sensor at a number of different concentrations of $NH_3$, $O_2$, and $H_2O$, and using the measured data to determine the values of the terms $A^1_{NH3}$, $B^1_{NH3}$, $C^1_{NH3}$, and $D^1_{NH3}$ using Equation 2 above to fit the data. The sensor can then be exposed to a gas mixture that contains no $NH_3$, and the response of the sensor measured at a number of different concentrations of $NO_2$, $O_2$, and $H_2O$. This measured data can then be used to determine the values of the terms $A^1_{NO2}$, $B^1_{NO2}$, $C^1_{NO2}$, and $D^1_{NO2}$ using Equation 2 above to fit the data.

Once the values of the terms $A^1_{NH3}$, $B^1_{NH3}$, $C^1_{NH3}$, $D^1_{NH3}$, $A^1_{NO2}$, $B^1_{NO2}$, $C^1_{NO2}$, and $D^1_{NO2}$ have been determined, the values of these terms can be used to represent the response characteristics of the first sensor as:

$$\text{EMF}^1 = \text{emf}^1_{NH3} + \text{emf}^1_{NO2} = \quad \text{(Equation 3)}$$

$$\left(\sinh^{-1}\left[(NH_3) \div \left(A^1_{NH3} \cdot \sqrt[C^1_{NH3}]{(O_2)} \cdot \sqrt[D^1_{NH3}]{(H_2O)}\right)\right] \div B^1_{NH3}\right) + \left(\sinh^{-1}\left[(NO_2) \div \left(A^1_{NO2} \cdot \sqrt[C^1_{NH2}]{(O_2)} \cdot \sqrt[D^1_{NO2}]{(H_2O)}\right)\right] \div B^1_{NO2}\right)$$

A second sensor (j=2) can be similarly characterized by exposing the sensor to a gas mixture that contains no $NO_2$, measuring the response (emf output) of the sensor at a number of different concentrations of $NH_3$, $O_2$, and $H_2O$, and using the measured data to determine the values of the terms $A^2_{NH3}$, $B^2_{NH3}$, $C^2_{NH3}$, and $D^2_{NH3}$ using Equation 2 above to fit the data. The sensor can then be exposed to a gas mixture that contains no $NH_3$, and the response of the sensor measured at a number of different concentrations of $NO_2$, $O_2$, and $H_2O$. This measured data can then be used to determine the values of the terms $A^2_{NO2}$, $B^2_{NO2}$, $C^2_{NO2}$, and $D^2_{NO2}$ using Equation 2 above to fit the data.

Once the values of the terms $A^2_{NH3}$, $B^2_{NH3}$, $C^2_{NH3}$, $D^2_{NH3}$, $A^2_{NO2}$, $B^2_{NO2}$, $C^2_{NO2}$, and $D^2_{NO2}$ have been determined, the values of these terms can be used to represent the response characteristics of the second sensor as:

$$\text{EMF}^2 = \text{emf}^2_{NH3} + \text{emf}^2_{NO2} = \left(\sinh^{-1}\left[(NH_3) \div \left(A^2_{NH3} \cdot \sqrt[C^2_{NH3}]{(O_2)} \cdot \sqrt[D^2_{NH3}]{(H_2O)}\right)\right] \div B^2_{NH3}\right) + \left(\sinh^{-1}\left[(NO_2) \div \left(A^2_{NO2} \cdot \sqrt[C^2_{NH2}]{(O_2)} \cdot \sqrt[D^2_{NO2}]{(H_2O)}\right)\right] \div B^2_{NO2}\right) \quad \text{(Equation 4)}$$

It will be appreciated that the method described here is not limited to two sensors, nor is it limited to a sensor whose output is influenced by two gas species of interest. As expressed in Equation 1, the total EMF output of a sensor can be expressed as the sum of the emf contributions of any number of gas species in a gas mixture to which the sensor is responsive. Depending on the level of measurement accuracy required, it may be necessary to characterize the response of a given sensor to additional gases that influence the sensor output by a level that is not considered negligible. Additional terms $A_i^j$, $B_i^j$, $C_i^j$, and $D_i^j$ can be determined for as many sensors and as many gases as required.

Once the terms $A_i^j$, $B_i^j$, $C_i^j$, and $D_i^j$ are determined for the sensors and the gases of interest, they can be substituted into an equation equivalent to Equation 1 to describe the response characteristics of each gas sensor to the gas species of interest. This information can be used to determine the values of lookup tables in the signal processor electronic controller 30 of FIG. 1 that can be used to extract gas concentration information from sensor readings as described earlier. Alternatively, the characteristic equations of each sensor, mathematically equivalent to Equation 1 with appropriate values assigned to the terms $A_i^j$, $B_i^j$, $C_i^j$, and $D_i^j$, may be programmed into the signal processor electronic controller 30 of FIG. 1 to allow direct calculation of gas species concentrations from measured sensor output readings.

While this invention has been described in terms of exemplary embodiments thereof, it is not intended to be so limited, but rather only to the extent set forth in the claims that follow.

We claim:

1. A method for representing in a sensor processor controller the response characteristics of a first reference gas sensor to a plurality of gas species, the method comprising the steps of
   a) measuring the output of the first reference gas sensor while exposing the first reference gas sensor to a gas mixture comprising a predetermined concentration of a first gas species in the presence of a fixed concentration of a second gas species;
   b) repeating step a) for a number of different concentrations of the first gas species;
   c) measuring the output of the first reference gas sensor while exposing the first reference gas sensor to a gas mixture comprising a predetermined concentration of the second gas species in the presence of a fixed concentration of the first gas species;
   d) repeating step c) for a number of different concentrations of the second gas species;
   e) determining coefficients of a first functional relationship relating the first reference gas sensor output to the concentrations of the first gas species and the second gas species, wherein the first functional relationship includes the summation of a first term and a second term, the first term being proportional to the inverse hyperbolic sine of the product of a first coefficient and the concentration of the first gas species in the gas mixture and the second term being proportional to the inverse hyperbolic sine of the product of a second coefficient and the concentration of the second gas species in the gas mixture, using the measured first reference gas sensor outputs and gas mixture concentrations from steps a) and c); and f) storing a representation of the first functional relationship determined in step e) in a non-transitory computer-readable medium that is part of or readable by the sensor processor controller;

wherein the number of repetitions of steps a) and c) is chosen such that the representation of the first functional relationship represents the response characteristics of the first reference gas sensor to a predetermined level of accuracy.

2. The method of claim 1, wherein the sensor processor controller is programmed to determine a number representing the concentration of one of the first gas species or the second gas species by receiving a gas sensor signal and performing a calculation using the received gas sensor signal, wherein the calculation is related to the representation of the first functional relationship.

3. The method of claim 1, wherein the sensor processor controller is programmed to determine a number representing the concentration of one of the first gas species or the second gas species by receiving a gas sensor signal and performing a table lookup based on the received gas sensor signal, wherein the table contains values related to the representation of the first functional relationship.

4. The method of claim 1, further including the steps of:

g) measuring the output of a second reference gas sensor while exposing the second reference gas sensor to a gas mixture comprising a predetermined concentration of the first gas species in the presence of a fixed concentration of the second gas species;

h) repeating step g) for a number of different concentrations of the first gas species;

i) measuring the output of the second reference gas sensor while exposing the second reference gas sensor to a gas mixture comprising a predetermined concentration of the second gas species in the presence of a fixed concentration of the first gas species;

j) repeating step i) for a number of different concentrations of the second gas species;

k) determining coefficients of a second functional relationship relating the second reference gas sensor output to the concentrations of the first gas species and the second gas species, wherein the second functional relationship includes the summation of a third term and a fourth term, the third term being proportional to the inverse hyperbolic sine of the product of a third coefficient and the concentration of the first gas species in the gas mixture and the fourth term being proportional to the inverse hyperbolic sine of the product of a fourth coefficient and the concentration of the second gas species in the gas mixture, using the measured first reference gas sensor outputs and gas mixture concentrations from steps g) and i); and l) storing a representation of the second functional relationship determined in step k) in a non-transitory computer-readable medium that is part of or readable by the sensor processor controller;

wherein the number of repetitions of steps g) and i) is chosen such that the representation of the second functional relationship represents the response characteristics of the second reference gas sensor to a predetermined level of accuracy.

5. The method of claim 4, wherein the sensor processor controller is programmed to determine a number representing the concentration of one of the first gas species or the second gas species by receiving a first gas sensor signal and a second gas sensor signal, and performing a calculation using the received first gas sensor signal and second gas sensor signal, wherein the calculation is related to the representation of the first functional relationship and the representation of the second functional relationship.

6. The method of claim 4, wherein the sensor processor controller is programmed to determine a number representing the concentration of one of the first gas species or the second gas species by receiving a first gas sensor signal and a second gas sensor signal and performing a table lookup based on the received first gas sensor signal and second gas sensor signal, wherein the table contains values related to the representation of the first functional relationship and the representation of the second functional relationship.

7. A device for determining the concentration of a first gas species in a gas mixture, the device having means for producing a gas concentration value output in response to an input, said input comprising an output signal from a gas sensor, wherein the means for producing a gas concentration value comprises a representation of a first functional relationship relating the output signal from the gas sensor to the concentrations of the first gas species and a second gas species, wherein the first functional relationship includes the summation of a first term and a second term, the first term being proportional to the inverse hyperbolic sine of the product of a first coefficient and the concentration of the first gas species in the gas mixture and the second term being proportional to the inverse hyperbolic sine of the product of a second coefficient and the concentration of the second gas species in the gas mixture.

* * * * *